United States Patent [19]

Stubblebine

[11] Patent Number: 4,787,972

[45] Date of Patent: Nov. 29, 1988

[54] TWO-STAGE FILTER APPARATUS

[75] Inventor: Warren Stubblebine, Sandusky, Ohio

[73] Assignee: Stein Associates, Inc., Sandusky, Ohio

[21] Appl. No.: 50,191

[22] Filed: May 15, 1987

[51] Int. Cl.4 ................ B01D 33/04; B01D 36/00
[52] U.S. Cl. ..................... 210/196; 210/258; 210/297; 210/512.1; 210/167; 210/DIG. 8
[58] Field of Search ............. 210/167, 195.1, 196, 210/197, 258, 259, 297, 300, 304, 307, 324, 400, 416.5, 512.1, DIG. 8; 99/408

[56] References Cited

U.S. PATENT DOCUMENTS

| | | | |
|---|---|---|---|
| 3,456,798 | 7/1969 | Urdanoff | 210/167 |
| 3,608,472 | 9/1971 | Pelster et al. | 99/408 |
| 3,616,909 | 11/1971 | Lowrey et al. | 210/167 |
| 3,759,388 | 9/1973 | Thomason | 210/DIG. 8 |
| 3,970,552 | 7/1976 | Bongert | 210/512.1 |
| 4,081,375 | 3/1978 | Deal et al. | 210/400 |
| 4,110,218 | 8/1978 | Marriott et al. | 210/259 |

FOREIGN PATENT DOCUMENTS 2522523  9/1983  France ................. 210/400

Primary Examiner—Richard V. Fisher
Assistant Examiner—Linda S. Evans
Attorney, Agent, or Firm—Baldwin, Egan & Fetzer

[57] ABSTRACT

A two-stage filter apparatus for removing particles entrained in a liquid wherein the liquid is initially presented to the first filter stage having an endless filter belt for removal of a portion of the entrained particles to result in a liquid having a decreased density of particles. This resulting liquid of decreased density is then presented to a cyclone filter in the second filter stage and divided into two parts, one part which is substantially free of any particles which is then available for its intended use and a second part that is presented to another endless filter belt and returned serially to the first filter and then the second filter stages for subsequent filtering of particles.

2 Claims, 4 Drawing Sheets

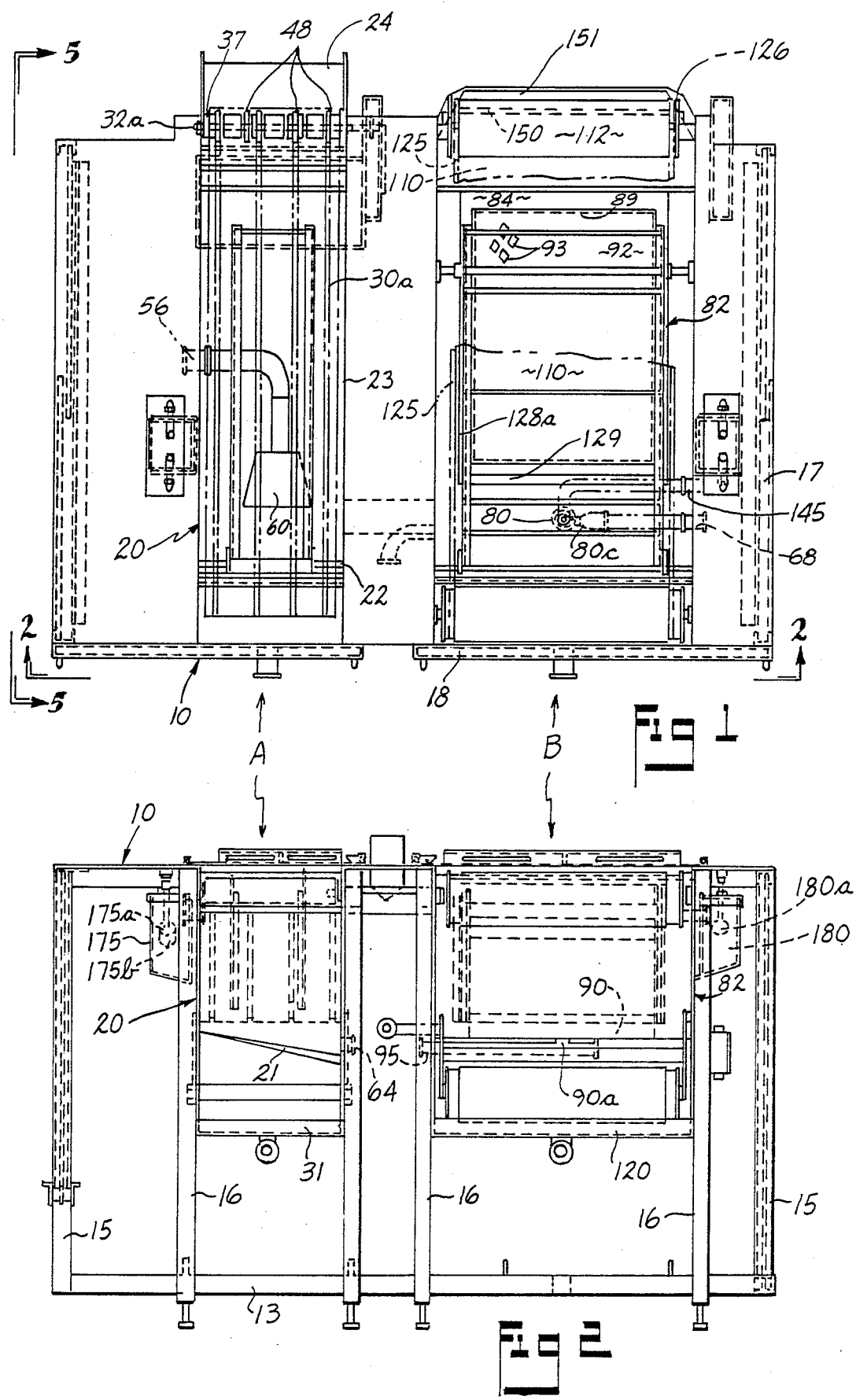

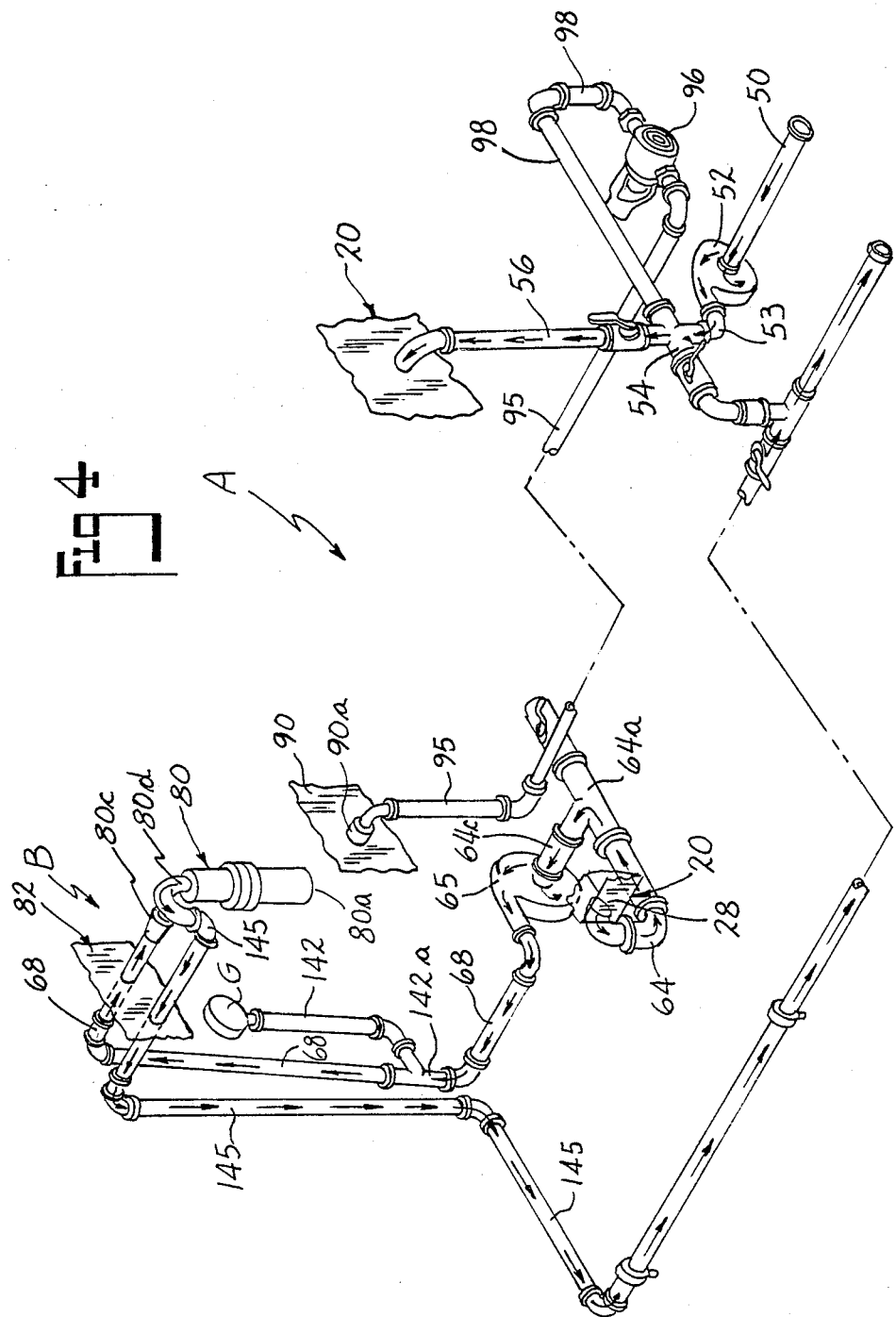

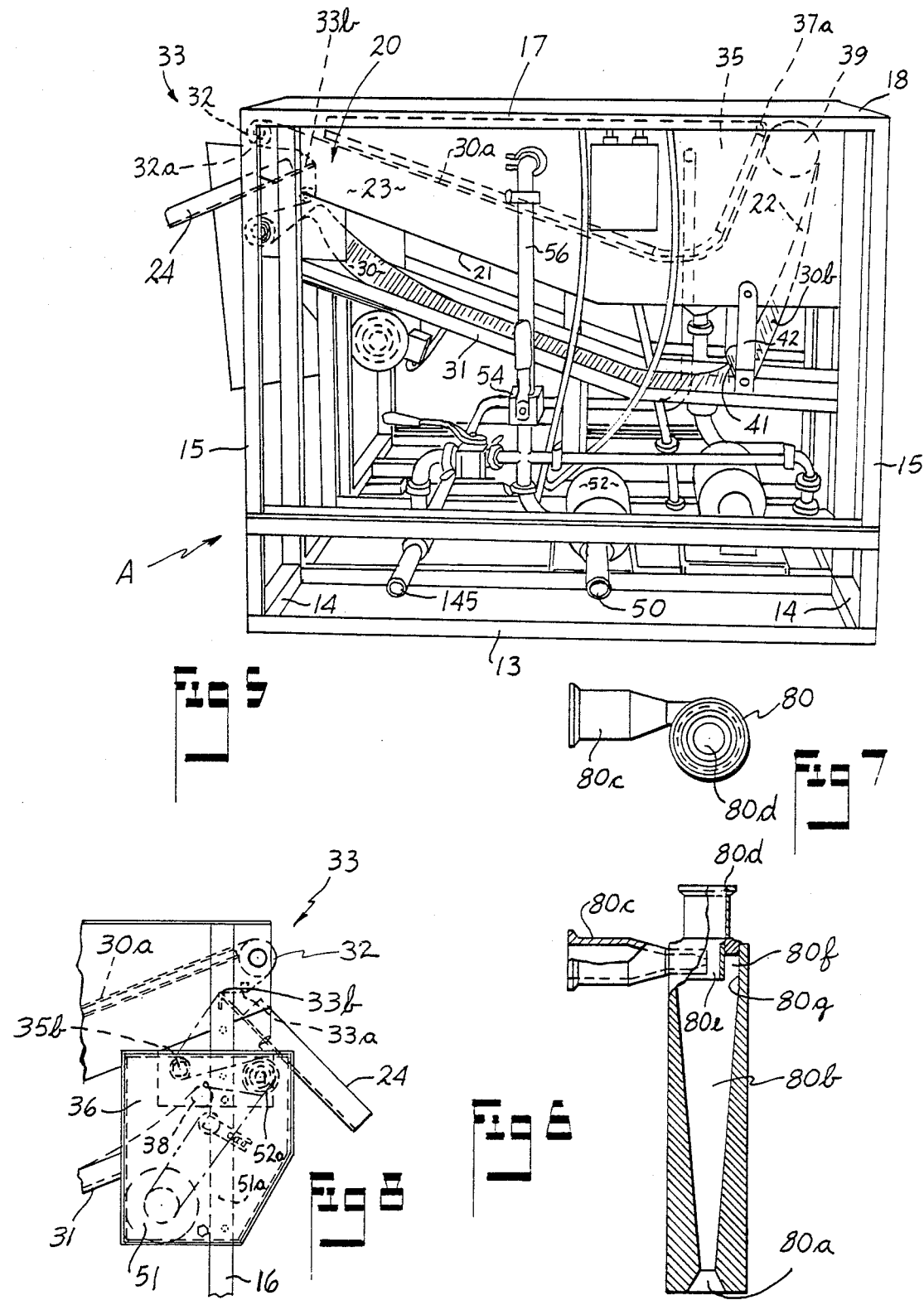

TWO-STAGE FILTER APPARATUS

This invention relates to filter apparatus especially designed to accomplish the removal of particles entrained in a liquid and in particular from liquid vegetable cooking oil used in commercial types of cooking apparatus commonly referred to in the related art as deep fat fryers.

This invention relates generally to the type of apparatus disclosed in the assignee's U.S. Pat. No. 4,081,375 and also to prior art cited therein.

In particular, the filter apparatus of the present invention distinguishes over said prior art by incorporating therein new and novel two-stage filtering apparatus operable to serially remove in a first stage relatively large particles from the liquid oil and then in a second stage the removal of relatively minute particles from said oil.

BACKGROUND OF THE INVENTION

In many cases the useful life of vegetable cooking oil commonly used in commercial deep fat fryers or the like can be extended by removing sedimentary solids from the oil. Many components, e.g., salt or eggs, of product coatings, whether batter or breading, can cause oil problems including an acceleration or build-up of free fatty acid in the oil. In addition, charred particles of sedimentary solids may transfer a char taste to the oil, and very fine charred particles may also give a premature charred color to the oil. The solution to these problems is to remove the sedimentary solids, whether crumbs or finely divided suspended particles, from the oil before these problems occur.

Another area of concern is the fact that crumb accumulation, wherein heavier particles settle out of the oil, can adversely affect the performance of the fryer, whether it is a direct heated type or an indirect heated type of fryer as those fryer structures are referred to in the related art. With either heating method, crumb accumulation can adversely affect heat transfer. Removal of the sedimentary solids from the cooking oil will prevent such problems from arising.

The assignee's filter apparatus as disclosed in its U.S. Pat. No. 4,081,375 utilizes a single stage filtering structure incorporating a reservoir into which particle contaminated cooking oil from the fryer unit is disposed. The bottom portion of the reservoir defines an open-end compartment under negative pressure which is effective to draw treated oil out of the compartment to be returned to the fryer. An endless metallic mesh filter belt is disposed over the open end of the compartment in the path of oil movement in the reservoir under the influence of the negative pressure source and is operable to entrap solid particles thereon. Such entrapment continues until a layer of particles is formed on the portion of said belt overlying the compartment at which time the belt is actuated to place another "clean" portion of the belt over said compartment opening. Alternatively, the endless belt may be continuously actuated at a relatively slow rate over said compartment. The layer of particles entrapped on the belt may then be removed by any suitable means such as a blade extending transversely across the belt adjacent its one end and said particle layer is then discarded.

A primary advantage of the two-stage filter apparatus of the present invention is that the removal of substantially all of the particulate materials may be accomplished serially in such manner as to provide substantially particulate-free oil to be returned to the fryer than heretofore capable.

A further advantage of the filter apparatus of the present invention is that it incorporates two stages of filtration, one defined as a coarse filter stage wherein relatively large particles as for example 5/32" in diameter may be removed from the oil and the second as a fine filter stage wherein particles as small as 20 microns may be removed from the oil.

Another advantage represented by the two-stage filter of the present invention is that the two stages are serially connected whereby oil containing particulate material is initially presented to the coarse filter stage and then to the fine filter stage, and further wherein filtered oil from the fine filter stage is re-connected or re-cycled into the input of the coarse filter stage and thereby re-cycled through both coarse and fine filter stages to provide an output of substantially particulate-free oil for return to the fryer.

Other advantages of the present invention will become apparent from the following description of a preferred embodiment thereof and as is also set forth in the accompanying drawings.

BRIEF DESCRIPTION OF THE DRAWINGS

FIG. 1 is a top plan view of the two-stage filter apparatus of the present invention;

FIG. 2 is a side elevation of the filter apparatus looking in the direction of the arrows 2—2 in FIG. 1;

FIG. 4 is an isometric view of the piping utilized in the filter apparatus to interconnect its two filter stages;

FIG. 5 is an isometric side view looking in the direction of the arrows 5—5 of FIG. 1;

FIG. 6 is a vertical sectional view of the cyclone device utilized in the fine filter stage;

FIG. 7 is a top plan view of the cyclone device; and,

FIG. 8 is a partial sectional view of the drive mechanism for the endless filter belt in the coarse filter stage.

DESCRIPTION OF DISCLOSED EMBODIMENT

Figure 3:
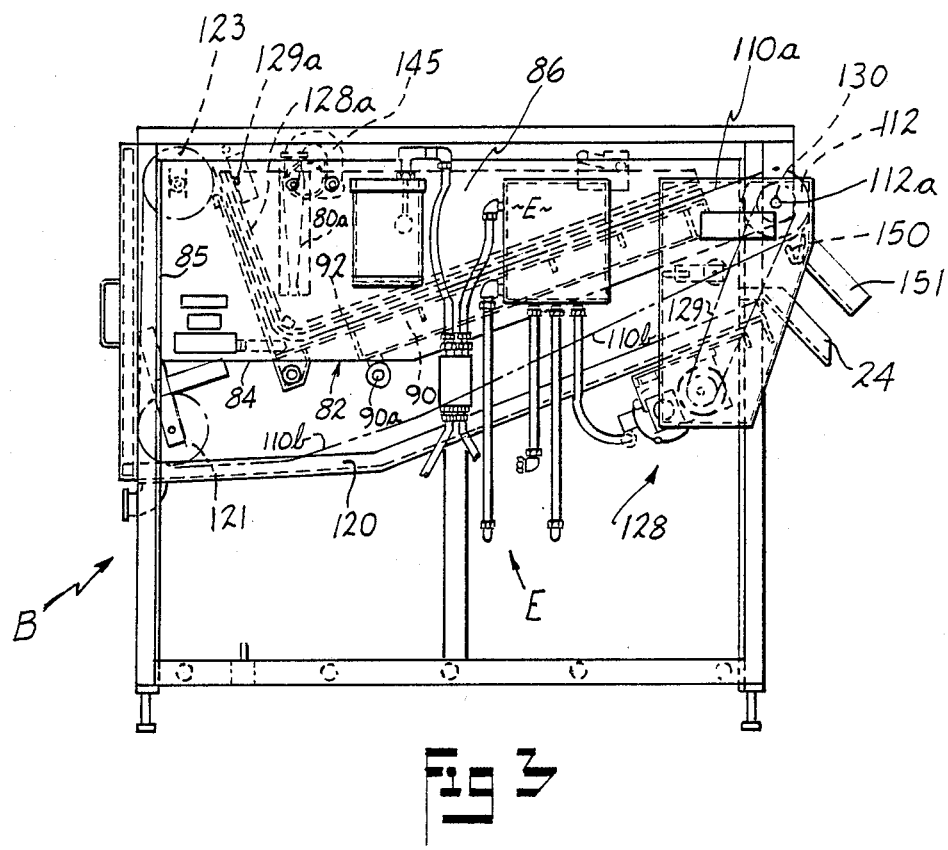
FIG. 3 is a side elevation view looking in the direction of the arrows 3—3 in FIG. 1.

Referring now to FIGS. 1-5, the novel filtering apparatus comprises separate coarse and fine filter stages identified respectively at A and B mounted within a supporting box-like frame identified in its entirety at 10. Frame 10 is supported on wheels being thereby mobile.

As best seen in FIGS. 2 and 5, frame 10 has a base comprising bottom horizontally disposed side and end base members 13 and 14 connected at their ends in rectangular relation to each other.

Uprights 15 disposed at each corner of the base of the frame are suitably attached thereto and extend vertically upwardly therefrom to the top of the frame. Additional upright members 16 disposed in spaced relation to each other along each side base members 13 are similarly fastened at their lower end to their associated side base member and extend vertically upwardly to the top of said frame. The top of the frame 10 comprises side and end bar members 17 and 18 respectively connected in rectangular relation at their respective ends and to the top end of each upright members 15 and 16 to define the somewhat box-like structure on frame 10.

As thus formed, frame 10 comprises two sections or compartments into which the coarse and fine filter stages A and B, respectively, are located.

Coarse filter stage A comprises a reservoir or compartment 20 which is triangular-shaped in cross section having a base wall 21 connected in fluid-tight relation at its lower end to the bottom edge of end wall 22 and along its opposed side edges to upstanding triangularly shaped opposed side walls 23. As noted in FIG. 5, the base wall 21 inclines downwardly from left to right to an intermediate position whereat it extends substantially horizontal to connect with the end wall 22.

As best seen in FIGS. 5 and 8, an endless mesh-type filter belt 30 extends around an idler roll 32 rotatably mounted between the reservoir's side walls 23 closely adjacent the open end 33 thereof whereby the upper run 30a is located within reservoir 20. A pair of parallel-spaced triangular-shaped retainer plates 35 being somewhat the same configuration as the cross-sectional contour of the reservoir are pivotally attached at 37a to the side walls 23 of reservoir 20 and positioned within the latter to retain the upper run 30a of said filter belt within the reservoir.

A second idler roll 39 is rotatably mounted between the side walls 23 at the opposite end of the reservoir 20 adjacent the top thereof as seen in FIG. 5, over which extends the upper run 30a of said filter belt, and which belt then extends above and then outside of the end wall 22, becoming thus the lower run 30b of said belt which extends downwardly therefrom and around roller 41 rotatably mounted between brace members 42 and 43 carried within frame 10 below and exterior to reservoir 20. Said lower belt run 30b extends into tray 31 disposed below said reservoir 20 and extending therealong, being thus positioned to catch oil dripping therefrom.

As best seen in FIGS. 5 and 8, idler roll 32 is rotatably supported on shaft 32a between the upstanding walls 23 at the open end 33 of the reservoir 20. The belt extends downwardly from said idler roll 32, under and around a stationary bar 33a supported between the reservoir side walls 23, and projecting rearwardly from a rectangular chute 24 attached to said frame 10 and extending outwardly and downwardly from the latter. Said belt extends around a second idler roll 35b rotatably supported between bracket plates 36 disposed below the reservoir 20 and supported within the frame 10. A drive roll 37 is likewise rotatably supported between the aforementioned bracket plates 36 located outwardly of the idler roll 35 adjacent the end of the frame 10 and below chute 24.

Said belt 30 extends over said drive roll 37 and a follower roll 38 rotatably disposed intermediate said idler roll 35b and drive roll 37. The drive roll 37 FIG. 1 is provided with sprockets 48 which are in spaced relation to each other longitudinally along said roll and rotatable therewith and which engage the belt 30 sufficiently to move the same through the reservoir as drive roll 37 is rotated.

A suitable electric motor drive unit 51, which may be a conventionally available variable speed motor drive unit, is mounted within frame 10 and drivingly connected by endless drive chain 51a to drive sprocket 52a fixed on drive roll 37 effective upon actuation to rotate said roll 37 and the aforementioned sprockets 48 thereon and continually advance the upper run 30a of endless belt 30 through reservoir 20.

As best seen in FIGS. 1, 4 and 5, dirty or particulate contaminated oil from the fryer (not shown) is adapted to be connected by inlet pipe 50 to the coarse filter stage A. Pipe 50 connects to the input of a suitable centrifugal-type feed pump 52, one suitable pump being the Volute Centrifugal pump Model No. 4V2 made by Crepaco Company of Lake Mills, Wis. The output of pump 52 connects by pipe 53, T-connector 54 and pipe 56 to funnellike inlet 60 which is disposed above the upper run 30a of endless belt 30. Preferably inlet funnel 60 is located below the normal level of the oil in the reservoir 20 to reduce possible turbulence and resulting aeration of the oil entering said reservoir.

As best seen in FIGS. 1, 2 and 4, an outlet pipe 64 connects at its one end to the right side wall 28 of the reservoir 20, thus communicating with the same, and its opposite end is connected to T-fitting 64a. Pipe 64c connects between said T-fitting 64a and the input of pressure pump 65. The outlet of said pump 65 is connected by pipe 68 to the inlet (cyclone filter 80) of fine filter stage B. One suitable pump is the Volute Centrifugal pump Model No. 8V2 also made by Crepaco Company of Lake Mills, Wis. The base wall 21 of reservoir 20 as seen in FIG. 2 slopes downwardly from left to right thus providing for the oil therein to likewise seek the lowermost portion at the right side for exit at said point through outlet pipe 64.

With dirty oil from the fryer being introduced by inlet pipe 50 and funnel inlet 60 into the reservoir 20 of the coarse filter stage A, the endless belt 30 is drivingly continuously actuated to move its upper run 30a from right to left as viewed in FIG. 5, whereby particulate materials in the oil become entrapped and are carried by the belt run 30a toward the left open end of the reservoir 20. Said belt then passes over the idler roll 32 and bar 33a as best seen in FIG. 8, whereby the entrapped particles are knocked off said belt run and fall into the chute 24 for disposal. Said belt continues and passes over the upper edge of downwardly extending end 33b of said chute 24 whereat additional particulate material is removed from said belt run and falls into said chute.

The endless belt 30 is normally woven of stainless steel wire, and as understood, may have any combination of mesh size, wire diameter and style of weaving depending upon the results to be achieved. As one example of belt material, in the present embodiment of filter apparatus a mesh size of 5/32 inch is utilized for the endless belt 30 in the coarse filter stage A.

As aforementioned, outlet pipe 64 as seen in FIGS. 2 and 4 connects with the bottom of reservoir 20 and is the outlet of filter stage A. Outlet pipe 64 in turn connects to the inlet of the aforementioned pump unit 65, the outlet of said pump connecting by pipes 68 to a cyclone-type filter or clarifier identified at 80 which is the inlet of fine filter stage B.

As best seen in FIGS. 1-4, fine filter stage B is disposed alongside coarse filter stage A within frame 10 and comprises a box-like reservoir 82 being somewhat similar in configuration to the reservoir 20 of coarse filter stage A, but substantially larger in dimension. As seen in FIG. 1, the width of fine filter stage B is approximately twice that of reservoir 20 of coarse filter stage A to enable said fine filter stage B to hold a larger quantity of liquid or oil in its said reservoir 82.

The reservoir 82 comprises a base 84 connected at its one end to the bottom edge of end wall 85, and along its opposed sides to the bottom edge of upstanding side walls 86. As seen in FIG. 3, reservoir 82 is somewhat triangular in cross section and is mounted in frame 10 such that the top edge of the end wall 85 is approximately at the same level as the opposite end of the reservoir as represented by the opposed edge of the base 84.

The base 84 is formed with a rectangular opening 89 into which is fitted an open-top box 90, herein also referred to as a suction box, to thus communicate with the interior of reservoir 82. As best seen in FIGS. 1 and 3, a flat plate 92 overlies the open top of suction box 90 and, as shown, is provided with a plurality of spaced diamond-shaped holes or openings 93. Suction box 90 is provided with an outlet port 90a at its lowermost end which connects to one end of pipe 95.

Pipe 95, FIGS. 2 and 4, connects at its opposite end to the inlet of a suitable suction pump 96. One pump that has proven satisfactory is Viking Pump Model G724 manufactured by the Viking Company and which is operable to create a flow out of suction box 90 of approximately five (5) gallons per minute. The outlet of pump 96 is connected by pipe 98 to T-coupling 54 and pipe 56 through funnel inlet 60 to the inlet of coarse filter A. In this manner, the suction box 90 of the fine filter stage B is connected back to the inlet of the coarse filter stage A whereby oil from said box 90 and reservoir 82 of said stage B is re-cycled back to the input of coarse filter stage A for repetitive cycles of serial filtering by the coarse filter stage A and then fine filter stage B.

As seen in FIGS. 1-3, an endless filter belt 110 of substantially fine wire mesh is disposed in reservoir 82 and extends around idler roll 112 which is rotatably supported on shaft 112a between the upstanding side walls 86 at the open end of the reservoir 82. The belt extends downwardly from said idler roll 112, out of and below the reservoir 82 and its bottom run 110b extends over tray 120 supported in frame 10 therebelow. The bottom run 110b of belt 110 extends around follower roller 121 located at the opposite end of tray 120 being rotatably supported thereat within frame 10, and said belt run then extends upward at said end and around idler roll 123 rotatably supported adjacent the top edge of the closed end of the reservoir 82 as seen in FIG. 3. Belt 110 is provided on each side with an endless roller chain 125 which engages with sprockets 126 mounted on opposite ends of the shaft 112a of idler roll 112.

A suitable motor drive 128, as seen in FIG. 3, mounted within frame 10 is drivingly connected by endless chain 129 to drive sprocket 130 mounted on idler roll shaft 112a effective upon actuation to continually advance the upper run 110a of endless belt 110 through reservoir 82.

A suitable source of electrical current as indicated generally at E FIG. 3 may be utilized to provide electrical energy to the aforementioned pump units 52, 65 and 96 and belt motor drives 51 and 128.

A pair of upright triangular-shaped retainer plates 128a, similar to belt retainer plates 35 of filter stage A, are pivotally attached adjacent one end at 129a between the side walls 86 of reservoir 82, and as shown in FIG. 3, are positioned in said reservoir to lay over and upon the upper run 110a of the endless belt 110 to thereby retain said upper run in close proximity to the surfaces of end wall 85 and the plate 92 overlying the open top of suction box 90 as said upper belt run moves thereacross.

As best seen in FIGS. 1, 3, 4 and 6, the cyclone-type filter or clarifier device 80 defines the inlet of the fine filter stage B and is suspended vertically within the reservoir 82 such that its "under flow exit" 80a is spaced closely to and above the upper run 110a of endless belt 110.

Cyclone device 80 as seen in FIGS. 6 and 7 is cylindrical in configuration having an interiorly formed chamber 80b extending centrally therethrough, being of inverted conical shape in cross section whereby the smallest diameter of the cone is at the bottom and its largest diameter is at the top. The "under flow exit" 80a is flared in cross section to permit an enlarged spray to exit therefrom and onto the upper run 110a of the filter belt 100.

The inlet 80c of the cyclone device 80 extends perpendicular to the longitudinal axis of said device and connects with the chamber 80b approximately at the periphery thereof closely adjacent to the top of the chamber 80b.

The outlet of the cyclone device 80 as is identified at 80d is located at the top thereof, and is in longitudinal extension with respect to the chamber 80b.

A ring-like collar 80e is disposed in the lower end of the outlet 80d and extends into the upper end of the chamber 80b to define an annular space 80f between said ring 80e and the adjacent wall 80g of said chamber into which the inlet flow is initially presented to the chamber 80b. The inlet 80c is seen to communicate with chamber 80b within the confines of this annular space 80f.

Pipe 145 connects at its one end to the outlet 80d and its opposite end is intended to be connected back to the deep fat fryer (not shown) from which the dirty oil originated to thus return the cleansed oil thereto.

As is understood in the art, the cyclone device 80 operates on the principle of introducing liquid into the periphery of the upper end of chamber 80b under sufficient pressure to create an intense centrifugal action whereby the heavier solid particles are pressed against the chamber wall 80g and move progressively downwardly therein under the influence of the extremely high velocity vortex created therein, and said particles suspended in oil then pass through the "under flow exit" 80a. The collar 80e operates to skim off the cleaned liquid or oil centrally within said vortex, which oil then moves upwardly within said collar 80e and exits from said outlet 80d. As aforementioned, this cleaned oil passes out of outlet 80d and through pipe 145 for return to the fryer (not shown). The embodiment of two-stage filter assembly comprising the stages A and B disclosed herein is intended to provide an oil flow of approximately 30 gallons/minute to the fryer.

In the present filter apparatus the pump unit 65 is intended to provide a continuous flow of oil to the cyclone device 80 under a pressure of preferably 60 lbs. per square inch. As seen in FIG. 4, a pressure gauge "G" may be connected by pipe 142 and T-coupling 142a to pipe 68 connecting to the inlet 80c of cyclone device 80 so as to visually monitor the pressure of said oil flow thereto.

As aforementioned, the cyclone device 80 is positioned vertically within the reservoir 82 such that its "under flow exit" 80a is disposed slightly above the upper run 110a of the fine filter belt 110. As thus located, the oil flow out of said exit 80a falls upon the belt run 110a passing therebelow whereby at least a portion of the particulate material is entrapped on the belt as it moves through the oil bath in said reservoir, and the remaining mixture of oil and particulate material falls into the bath in the reservoir 82. As the upper belt run 110a moves over the idler roll 112, FIGS. 1 and 3, the particulate material carried thereon is engaged by knife blade 150 extending thereacross and said material is removed therefrom. Said separated particulate material then falls into exit chute 151 supported within frame 10 directly below said knife for disposal.

As seen at 175 in FIG. 2, a conventional high-low liquid level detector is fastened to one side wall of the reservoir 20 being open thereto so as to have oil disposed therein at the same level as the oil in said reservoir 20.

One detector suitable for use in the embodiment of filter system disclosed herein is made by Madison Laboratories Inc. of Madison, Conn. This detector is provided with two bulbs, one being the high level bulb 175a and the other the low level bulb 175b. Detector 175 is connected to the pump motor 52 and, as will be understood, is responsive to the high and low level bulbs 175a and 175b sensing the level of the oil in said reservoir 20 to electrically control the operation of said pump motor 52 and thereby maintain said oil within the desired level as defined by the level of said bulbs 175a and 175b.

In like manner, a similar liquid level detector identified in FIG. 2 at 180 is attached to the side wall of reservoir 82 and is provided with a single high liquid level bulb 180a which is capable of sensing the high level of the oil in reservoir 82 to electrically control the operation of the pump motor 65 thus controlling the delivery of oil to said reservoir 82.

As best seen in FIGS. 1 and 2, each of the trays 31 and 120 disposed respectively below reservoirs 20 and 82 is provided with a drain port 182, 183 which may be connected through suitable pipe connectors (not shown) for convenient disposal.

The operation of the two-stage filter apparatus of the present invention should now be readily understood.

Dirty hot oil from the deep fat fryer (not shown) is connected to the inlet pipe 50 and under the influence of pump 52 is connected through pipe 56 to the inlet (funnel 60) of the first or coarse filter stage A and into reservoir 20. Said oil is filtered by the endless belt 30 moving through the oil bath in said reservoir whereby particles are removed therefrom. Particles picked up by the upper run 30a of the endless belt 30 are carried by said belt run over idler roll 32 and bar 33a whereat the particles are knocked off said belt run and fall into the chute 24 for disposal. And, as aforesaid, said belt run 30a continues and passes over the upper edge 33b of chute 24 whereby additional entrapped articles are scraped off said belt and fall into said chute.

Filtered oil is then withdrawn from said reservoir 20 through outlet pipe 64 under the suction of pump unit 65 and connected by inlet pipe 68 to inlet port 80c of cyclone device 80 of fine filter stage B wherein said filtered oil from coarse filter stage A is further filtered. This further filtered oil from cyclone device 80 is substantially free of any particulate material and is connected from cyclone outlet 80d and through pipe 145 for return to the deep fat fryer unit (not shown).

Oil still containing particulate materials passes downwardly through cyclone device 80 and exits therefrom through its under flow exit 80a whereupon it falls onto the upper run 110a of endless belt 110 moving through the oil bath in reservoir 82. Said oil is thus again filtered by said moving belt run 110a, and said filtered oil, under the influence of suction created by suction pump 96, moves into and out of suction box 90 through pipe 95, pipe 98, T-connector 54 and pipe 56 to be returned to and reintroduced into the coarse filter stage A for serial filtering by first the coarse filter stage A and then by the fine filter stage B in the manner referred to above.

As will be understood, the endless filter belts 30 and 110 are continuously moved through the oil in their respective reservoirs 20 and 82 and the variable speed electric motor drives therefor may be adjusted to correspondingly change the linear speed of each of said filter belts and provide for maximum withdrawal of particulate material from the oil.

The two-stage filtering apparatus of the present invention has been described herein as applied to the continuous filtration of hot cooking oils. However, other applications may also be accommodated by the present invention such as for example filtration of other liquids to remove sedimentary solids or in the recovery of entrained solids from liquid-type slurries.

I claim:

1. A two-stage filter apparatus for removing particles entrained in a liquid comprising a frame, first and second filter stages mounted in side-by-side relation to each other in said frame, reservoir means in said first filter stage for holding a quantity of liquid containing particles, means for supplying liquid containing entrained particles to said reservoir means, mesh-type endless filter belt means in said reservoir means movable as the liquid enters into said reservoir means and being operable to entrap at least a portion of the entrained particles therein and thereby partially filter said liquid, said second filter stage having a cyclone generating filter means provided with an inlet, outlet and an under flow exit, pump means connecting the reservoir means to the first filter stage to the inlet of said cyclone generating filter means, reservoir means in said second filter stage disposed below the under flow exit of said filter means and positioned to receive a flow of liquid therefrom, said cyclone generating filter means being operable to divide the liquid entering the inlet into a first portion that is substantially free of any particles and a second portion containing entrained particles which egresses from said cyclone generating filter means through said under flow exit and into the reservoir means to said second filter stage, mesh-type endless filter belt means movable through the liquid in said latter reservoir means being operable to entrap at least a portion of the entrained particles therein and to thereby remove said entrapped particles from said second portion and thereby additionally filter said second portion, and suction means connecting the reservoir means of the second filter stage to the reservoir means of the first filter stage to return the filtered second portion of the liquid to said reservoir means of said first filter stage.

2. A two-stage filter apparatus as set forth in claim 1 and wherein the width of the second filter stage is substantially larger than the width of the first filter stage to enable the second filter stage to hold a larger quantity of liquid in its reservoir means.

* * * * *